United States Patent [19]

Honda et al.

[11] Patent Number: 5,154,866
[45] Date of Patent: Oct. 13, 1992

[54] MOLDING PROCESS FOR PREPARING POROUS POLYTETRAFLUOROETHYLENE ARTICLES

[75] Inventors: Norimasa Honda; Hirokazu Yukawa, both of Osaka, Japan

[73] Assignee: Daikin Industries, Ltd., Osaka, Japan

[21] Appl. No.: 862,180

[22] Filed: Apr. 2, 1992

[30] Foreign Application Priority Data

Apr. 4, 1991 [JP] Japan .................................. 3-71612

[51] Int. Cl.⁵ ...................... B29C 47/54; B29C 59/00; B29C 55/18
[52] U.S. Cl. ................................... 264/127; 264/118; 521/145; 521/134; 521/919
[58] Field of Search ................ 264/118, 127; 521/134, 521/145, 919

[56] References Cited

U.S. PATENT DOCUMENTS

| | | | |
|---|---|---|---|
| 4,650,815 | 3/1987 | Nambo et al. | 264/127 |
| 4,760,102 | 7/1988 | Moriyama et al. | 264/127 |
| 5,098,625 | 3/1992 | Huang et al. | 264/127 |
| 5,104,400 | 4/1992 | Berquer et al. | 264/127 |

*Primary Examiner*—Morton Foelak
*Attorney, Agent, or Firm*—Armstrong & Kubovcik

[57] ABSTRACT

A molding process for preparing long and thick, large porous PTFE articles comprising preparation steps of a powder for molding which includes a step of gelation of PTFE powder; a pre-forming step by a ram-extrusion; a baking step of the pre-formed article under a non-constrained circumstance; and if necessary, a cooling step; said powder for molding being containing a binder which has a melting point of lower than that of PTFE and does not decompose at a baking temperature of PTFE.

22 Claims, 1 Drawing Sheet

MOLDING PROCESS FOR PREPARING POROUS POLYTETRAFLUOROETHYLENE ARTICLES

BACKGROUND OF THE INVENTION

The present invention relates to a molding process for preparing porous articles of polytetrafluoroethylene (hereinafter referred to as "PTFE"). The porous PTFE articles obtained according to the present invention have specific characteristics due to their porosity, such as a permeability of gases and liquids, a property of catching and filtering fine particles, the lowest dielectric constant and dielectric loss tangent among solid materials, a toughness and a flexibility, in addition to own excellent properties of PTFE such as a heat resistance, a chemical resistance, a water and oil repelling property, an anti-tacking property, an incombustibility, a low friction factor and a weatherability. The molded articles are usable in wide industrial fields such as textile fields, medical fields as well as materials for filters and buildings.

Hitherto, porous PTFE molded articles have been prepared by paste-extruding non-baked PTFE fine powders obtained by emulsion polymerization together with a liquid lubricant, and then elongating (JP-B-13560/1967). However, this preparation process is suitable for preparing a wire coating, a thin sheet or a thin tube, but is not applicable to preparation of a thick article or a large article such as a cylindrical article.

The large and thick porous PTFE articles have been prepared by molding baked PTFE resin powders to a given shape under a pressure of 0.001 to 800 kg/cm$^2$, and then baking it at a temperature of above the melting point of PTFE (JP-A-66730/1986). According to this process, however, since the hard PTFE powders are pressed under a relatively low pressure of 0.001 to 800 kg/cm$^2$ into a given shape, the obtained pre-formed articles are brittle and difficult to handle. Further, for indending to prepare continuous porous PTFE articles when a continuous ram extrusion molding is employed, the bonding power between the pre-formed articles obtained by each stroke is poor. Therefore, continuous pre-formed articles cannot be prepared. For obtaining an additional bonding power, there is an atempt that a binder comprising a fluororesin powder or its dispersion is admixed. However, since an amount of the binder is at most 1% by weight, the continuous pre-formed article cannot be prepared by the above ram extrusion molding.

An object of the present invention is to provide a molding process for continuously, easily preparing large, thick and continuous porous PTFE articles.

SUMMARY OF THE INVENTION

The present invention relates to a molding process for preparing a porous PTFE article, which comprises the following steps;

(1a) mixing 5 to 40 parts (parts by weight, hereinafter the same) of a binder to 100 parts of a PTFE powder prepared by suspension polymerization (so called as "molding powder"), said binder comprising a resin powder which has a melting point of lower than that of PTFE and does not decompose at a baking temperature of PTFE, (1b) gelling the obtained mixed powder under the condition ranging from a temperature of not lower than the melting point of PTFE to a temperature of lower than the decomposition temperature of the binder, (1c) finely pulverizing the gelled material to a powder having an average particle size of 80 to 1200 μm, (1d) preparing a pre-formed article by ram-extruding the finely pulverized powder at a temperature ranging from a temperature of lower than the melting point of PTFE to a temperature of not lower than the melting point of the binder, and (1e) baking the pre-formed article under a non-constrained circumstance at a temperater of not lower than the melting point of PTFE.

The process comprising the steps of (1a) to (1e) is hereinafter referred to as "the first process".

The present invention also relates to a molding process for preparing a porous PTFE article, which comprises the following steps;

(2a) gelling a PTFE powder prepared by suspension polymerization at a temperature of not lower than the melting point of PTFE, (2b) finely pulverizing the gelled material to a powder having an average particle size of 80 to 1200 μm, (2c) mixing 5 to 40 parts of a binder to 100 parts of the finely pulverized PTFE gelled powder, said binder comprising a resin powder which has a melting point of lower than that of PTFE and does not decompose at a baking temperature of PTFE, (2d) preparing a pre-formed article by ram-extruding the mixture at a temperature ranging from a temperature of lower than the melting point of PTFE to a temperature of not lower than the melting point of the binder, and (2e) baking the pre-formed article under a non-constrained circumstance at a temperature of not lower than the melting point of PTFE.

The process comprising the steps of (2a) to (2e) is hereinafter referred to as "the second process". In the second process, the steps (2d) and (2e) are the same procedures as in the steps (1d) and (1e) in the first process, respectively.

The present invention further relates to a molding process for preparing a porous PTFE article, which comprises the following steps;

(3a) gelling a PTFE powder prepared by suspension polymerization at a temperature of not lower than the melting point of PTFE, (3b) finely pulverizing the gelled material to a powder having an average particle size of 5 to 1200 μm, (3c) mixing the finely pulverized gelled powder with an aqueous dispersion of a PTFE fine powder prepared by emulsion polymerization (so called as "fine powder") so that a weight ratio of the finely pulverized gelled powder/the PTFE fine powder is 100/5–40, and then coagulating the both powders, (3d) preparing a pre-formed article by ram-extruding the coagulated powder at 180° to 330° C., and (3e) baking the pre-formed article under a non-constrained circumstance at a temperature of not lower than the melting point of PTFE.

The process comprising the steps of (3a) to (3e) is hereinafter referred to as "the third process".

DETAILED DISCLOSURE OF THE INVENTION

Figure 1:
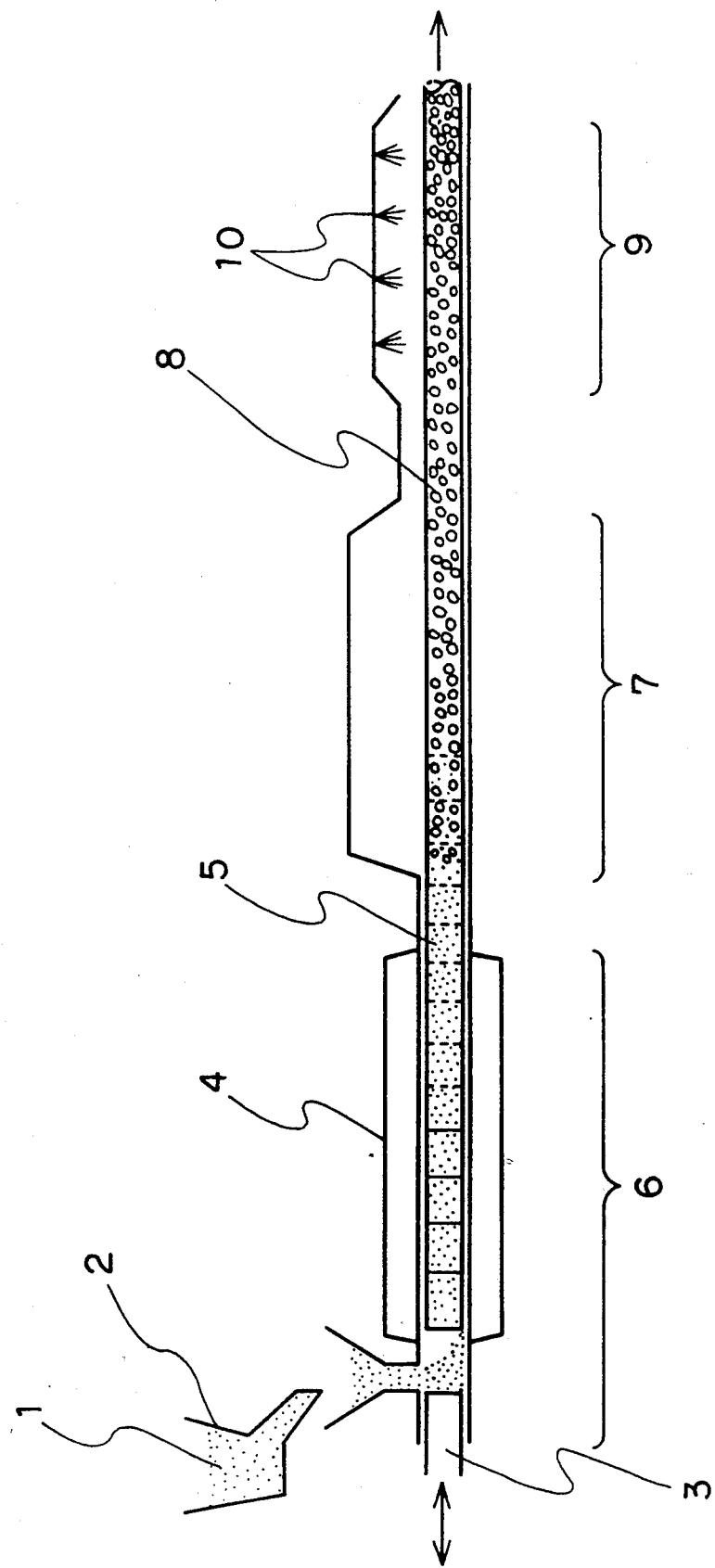
FIG. 1 show a diagramatic sectional view of a horizontal ram-extruder which is suitably usable in the present invention.

In the present invention, the ram-extrusion molding is employed as a low pressure compression molding. As a molding material there is used the mixed powder prepared by mixing the PTFE gelled powder with the binder comprising the resin powder having the specific thermal properties. The mixed powder is ram-extruded into the shape of pre-formed article, and then baked.

According to the present invention, the porous PTFE molded article can be prepared, because the gelled PTFE powder is ram-extruded at a temperature of lower than the melting point of PTFE. Further, the continuous molded article can be prepared, because the pre-formed artices obtained by each stroke of the ram-extrusion operations are bonded to each other by the binder.

It is assumed that the substantial porosity of the PTFE article according to the present invention can be formed in the following manner. Namely, since the hardened PTFE powder is ram-extruded at a temperature of lower than the melting point of PTFE, the PTFE particles are not bonded by melting, but are bonded via the binder at the contact portion of the PTFE particles. Therefore, there remain spaces between the PTFE particles, which makes the pre-formed article porous. The porosity can also be obtained in the course of the baking step. As mentioned above, the PTFE powder does not melt but the PTFE particles are bonded via the binder at the preforming step. When baking the pre-formed article under a non-constrained circumstance, a recovery force is produced in the direction against the pressure applied at the pre-forming step. Due to the recovery force and the expansion force of the PTFE particle itself, the space where the binder occupies are expanded to make the article more porous.

In the third process the PTFE fine powder acts as the binder. The reason is assumed that since the PTFE fine powder can be easily fibridized by applying a small shear, the fibrous PTFE fine powder bonds the PTFE gelled particles.

The processes of the present invention comprise the preparation steps of the powder for molding, the pre-forming step by ram-extrusion, and the baking step.

In the first process, the preparation steps of the powder for molding comprise the mixing step (1a) of the PTFE powder and the binder, the gelling step (1b) of the mixed powder, and the finely pulverizing step (1c) of the gelled material.

In the mixing step (1a), the binder which is mixed with the PTFE powder comprises one or more of resin powders which have a melting point of lower than PTFE and do not decompose at a baking temperature of PTFE. The melting point of a non-baked PTFE is about 340° to 350° C., and the baking temperature of PTFE is approximately 360° to 390° C. as described hereinafter. Accordingly, the melting point of the binder resin is about 210° to 340° C., preferably about 250° to 340° C., most preferably about 250° to 310° C. The thermal decomposition temperature of the binder resin is not lower than the baking temperature of 360° to 390° C. Examples of the resin which satisfies the above factors are, for instance, tetrafluoroethyleneperfluoroalkyl vinyl ether copolymer (PFA: melting point 300°-310° C., decomposition initiating temp. 380°-400° C.) tetrafluoroethylene-hexafluoropylene copolymer (FEP: melting point 270° C., decomposition initiating temp. 380°-400° C.), tetrafluoroethylene-ethylene copolymer (ETFE: melting point 260° C., decomposition initiating temp. 380° to 400° C.), polychlorotrifluoroethylene (PCTFE: melting point 210°-212° C., decomposition initiating temp. 360° to 380° C.), tetrafluoroethylene-vinylidene fluoride copolymer (TFE/VDF: melting point 130° C., decomposition initiating temp. 400° C.), tetrafluoroethylene-hexafluoropropylene-perfluoroalkyl vinyl ether copolymer (EPA: melting point 270° C., decomposition initiating temp. 380° to 400° C.), and a mixture thereof. Particularly, PFA and FEP are suitable in view of the above-mentioned relation between the melting point and the decomposition temperature. The resin for binder is mixed in the form of finely pulverized powder, particularly having an average particle size of about 5 to 700 μm, preferably 10 to 50 μm, most preferably 10 to 30 μm.

The role of the binder is to produce an integrated continuous article by bonding the PTFE particles to each other and by bonding each pre-formed article obtained by each stroke of the ram-extrusion operations.

The PTFE powder used in the present invention is the molding powder prepared by suspension polymerization having an average particle size of 10 to 100 μm, preferably 10 to 40 μm, most preferably 10 to 30 μm. As PTFE, there may be used a homopolymer of tetrafluoroethylene or a modified PTFE which is prepared by modifying tetrafluoroethylene with at least one copolymerizable ethylenically unsaturated monomer in an amount of up to 2% by weight. These polymers generally have a melting point of not lower than 330° C., and are not meltprocessable. Examples of the ethylenically unsaturated monomer are, for instance, olefins such as ethylene and propylene; halogenated olefins such as hexafluoropropylene, vinylidene fluoride and chlorofluoroethylene; perfluoro-alkyl vinyl ethers; and the like.

The mixing methods of the PTFE powder and the binder are not particularly limited, and may be a dry mixing method with a henschel mixer, a high speed mixer or a super mixer, or may be a wet mixing method such as mixing in the form of slurry or coagulating from the dispersion.

The mixing amount of the binder to the PTFE powder is 5 to 40 parts, preferably 10 to 20 parts to 100 parts of the PTFE powder. In the above-mentioned JP-A-66730/1986, there is disclosed that a fluororesin powder such as PFA, FEP, EPA or ETFE is mixed as a binder for the PTFE resin powder. The amount of the binder is, however, at most 1% by weight as described in Example 5 of the Japanese publication. According to the present invention, the necessary amount of the binder is at least 5 parts to 100 parts of the PTFE powder. When smaller than 5 parts, the above-mentioned bonding effects cannot be obtained. When larger than 40 parts, a porous article cannot be obtained because the gravity of the pre-formed article becomes larger, and also a continuous molding cannot be done because the necessary resistance against the wall cannot be obtained due to shrinkage of the pre-formed article at the pre-forming step.

In the gelling step (1b), the mixed powder is heated to a temperature of not lower than the melting point of PTFE, provided that lower than the decomposition temperature of the binder, to gel the mixed powder. The PTFE molding powder before gelling is a fine powder in such a form that fibers are tangled. Therefore, when pre-forming and baking the molding powder without gelling, the expansion force and the recovery force of the PTFE particles which are necessary for producing a porosity cannot be obtained, which results in insufficient porosity. Thus, the gelling step is the important step. As a result of the gelation, the fibrous PTFE is melted to be dense. In addition, as a result of the gelation, the PTFE particles are hardened, and the particles do not adhere to each other at the pre-forming step unless a high pressure is applied. Therefore, according to the present invention in which a high pressure is not applied, a porous molded article can be obtained. The molded article is in the state that PTFE and the binder are melted together.

The gelling temperature and time are selected so that the fibrous PTFE molding powder melts to be dense. Generally, the gelation is carried out by heating to a temperature of not lower than the melting point of PTFE, preferably 360° to 390° C. The heating time is optionally determined depending with an amount of powder. The mixed powder may be heated on a tray or may be heated continuously on a conveyor.

The co-melted gelled material is then finely pulverized into a powder having an average particle size of 80 to 1200 μm in the pulverizing step (1c).

When an average particle size of the gelled powder is smaller than 80 μm, the flowability of the powder worse, and also the molding processability becomes inferior. When larger than 1200 μm, the molding processability becomes inferior due to low packing density. Preferable average particle size is 300 to 600 μm. As the pulverizing method, there may be employed, for example, a usual dry pulverizing method and wet pulverizing method. The dry pulverizing method is preferalbe. The obtained gelled powder is supplied to the next pre-forming step as the powder for molding.

In the pre-forming step (1d), the ram-extruder is charged with the powder for molding, and the powder is ram-extruded with heating. However, the baking of PTFE is not carried out here. The object of the pre-forming is, as mentioned above, to produce a porous article and to be able to bake under a non-constrained circumstance. Therefore, during this step, the PTFE particle are not bonded to each other, but are bonded via the binder to produce an integrated continuous pre-formed article.

For that reason, the heating temperature (molding temperature) in the pre-forming step is not lower than the melting point of PTFE, and is optionally determined depending with a kind of the binder. In case that the binder is FEP or PFA, the preferred heating temperature is about 280° to 340° C. The heating can also reduce the pressure of the ram-extrusion.

For the pre-forming, there may be employed a usual vertical or horizontal ram-extruder as it is. When the baking is successively carried out after the pre-forming, there may be effectively employed the horizontal ram-extruder with a baking zone, and if necessary, a cooling zone in addition to a pre-forming zone, as shown FIG. 1.

The practical conditions of the pre-forming are different depending with a kind of the ram-extruder to be used, a shape of the desired porous article, a kind, size, amount of the binder, or a porosity of the desired porous article, and can be optionally determined. It is important, however, that the pre-formed article has such a strength that the pre-formed article is not destroyed during the baking step.

The pre-formed article prepared in the pre-forming step is supplied to the baking step, succesively or after stored.

In the baking step (1e), the pre-formed article in which the PTFE particles are bonded via the binder is heated at or above the melting point of PTFE, and then the PTFE particles are fused together to produce the porous articles, as mentioned above. At this time, it is important to bake the pre-formed article under the non-constrained circumstance. When baking the pre-formed article under a constrained circumstance or under pressure, the above-mentioned recovery force or expansion force of the PTFE particle cannot be utilized for obtaining a sufficient porosity.

The words "under a non-constrained circumstance" means the condition that the pre-formed articles is not constrained demensionaly, or is not pressed at least in the radial direction.

The baking is carried out at about 360° to 390° C., preferably 360° to 385° C. The baking temperature and time may be optionally determined according to a shape or size of the desired article.

The baking step may be carried out succesively as shown in FIG. 1. Alternatively, each of the pre-formed articles as they are or the pre-formed articles which are cut to a desired length may be baked in a batch type oven.

The baked porous article is cooled by a slow cooling method like allowing to stand or by a rapid cooling with air or water. This cooling does not give an essential influence to the porosity, but provides a flexible porous article because the crystallinity of PTFE becomes lower by a rapid cooling.

According to the second process of the present invention, the preparation steps of the powder for molding comprise the gelling step (2a) of the PTFE powder, the finely pulverizing step (2b) of the gelled material, and the mixing step (2c) of the PTFE gelled powder and the binder.

These steps (2a) to (2c) and their order are necessary for gelling the PTFE powder alone. The starting materials and treatments in the steps (2a) to (2c) as well as their effects are the same as those in the corresponding steps (1a) to (1c) of the first process. However, since the average particle size of the PTFE gelled powder is 80 to 1200 μm, the average particle size of the binder is regulated to about 5 to 100 μm, preferably 10 to 50 μm, in order to obtain a uniform mixing.

Since the mixed powder obtained according to the steps (2a) to (2c) contains the binder which is inferior in flowability. Within such an extent, the handling property is not so good as that of the first process. The resultant porous molded article has, however, the same performances as of the first process.

The powder for molding prepared by the steps (2a) to (2c) is supplied to the next pre-forming step (2d), subsequently the baking step (2e). The procedures and conditions in the steps (2d) and (2e) of the second process are substantially the same as those in the pre-forming step (1d) and the baking step (1e) of the first process, respectively.

In the third process, the similar porous PTFE article can be produced by using a PTFE fine powder prepared by emulsion polymerization as the binder. The PTFE fine powder comprises a hydrophobic PTFE fine particles which have round shape and have a diameter of 0.2 to 0.4 μm.

According to the third process, the PTFE powder (molding powder) is previously gelled in the gelling step (3a), which is the same as that in the second process. In the subsequent step, namely the pulverizing step (3b) of the PTFE gelled material, the gelled material is pulverized to a powder having an average particle size of 5 to 1200 μm, preferably smaller particle size, e.g. to 5 to 300 μm. When the pulverized powder has a smaller particle size, the surface area is larger, and thus the PTFE fine powder can be coagulated uniformly with the gelled powder.

The PTFE fine powder is used as the binder in the form of aqueous colloidal dispersion. The gelled powder prepared in the step (3b) is introduced into the aqueous colloidal dispersion of the PTFE fine powder, and then coagulated with the PTFE fine powder to obtain the coagulated (mixed) powder (step (3c)). Preferable concentration of the PTFE fine powder dispersion is 10 to 70% by weight, preferably 20 to 40% by weight. The gelled powder is mixed in such an amount that the weight ratio of gelled powder/PTFE fine powder in the coagulated powder is 100/5-40, preferably 100/10-25. When the amount of the PTFE fine powder is too small, the fine powder does not act as the binder. When larger, it is difficult to produce a porous article.

The coagulation procedures are carried out by introducing the gelled powder in the form of powder or in the form of aqueous dispersion into the aqueous dispersion of PTFE fine powder, then coagulated. When a water-insoluble organic liquid having a surface tension of not more than 35 dyns/cm is added to the above mixed dispersion during the coagulation step, the obtained particles are round particles having a proper size or in the form of granular. These powders are very easy to be handled.

The PTFE for the fine powder may be a homopolymer of tetrafluoroethylene or the above-mentioned modified PTFE. Among them, the PTFE modified with the perfluoroalkyl vinyl ether, particularly perfluoropropyl vinyl ether is preferred.

The coagulated powder consists of the gelled particle around which the PTFE fine particles are deposited and adhered. Therefore, its powder properties are excellent as of PTFE. The coagulated powder is supplied, preferably after drying, to the pre-forming step (3d) as the powder for pre-forming.

In the pre-forming step (3d), the pre-forming is carried out at a relatively lower temperatuer, i.e. 180° to 330° C., preferably 180° to 270° C., most preferably 180° to 250° C., because the PTFE fine powder in the coagulated powder can act as the binder at 180° to 250° C. The other procedures and conditions of the pre-forming are the same as those in the first and second processes.

The obtained pre-formed article is baked in the baking step (3e) which is carried out in the same manner as in the first and second processes.

The porous PTFE molded article prepared according to the present invention has an apparent density of 0.8 to 1.8, preferably 1.3 to 1.5 and a porosity of 63 to 17%, preferably 40 to 31%.

The preferred embodiment of the present invention by using a horizontal ram-extruder shown in FIG. 1 is explained hereinbelow.

In FIG. 1, the powder 1 for molding prepared according to the step (1c) or (2c) is intermittently supplied from a hopper 2 to a ram-extruder, and then extruded intermittently with a ram 3 into a die cylinder 4. The die cylinder 4 is kept at a pre-forming temperature by a heater (not shown). During the movement of the extruded powder within the die cylinder where the powder is compressed, the binder melts and bonds the non-melted PTFE particles to produce a continuous pre-formed article 5.

In a conventional horizontal ram-extruder, the baking and the cooling are also carried out within the die cylinder. According to the present invention, however, the baking is not carried out in the pre-forming zone (within the die cylinder).

The operation conditions of the pre-forming zone 6 according to the embodiment are as follows, when FEP or PFA is used as the binder and a porous bar having a diameter of 10 to 30 mm is produced.

Inner diameter of die cylinder: 10 to 30 mm$\phi$
Total length of die cylinder: 200 to 400 mm
Extruding pressure: 100 to 150 kg/cm$^2$
Pre-forming temperature:
   280° to 340° C. (for 1st and 2nd process)
   180° to 270° C. (for 3rd process)
Time for one cycle: 20 to 40 seconds.

The resultant pre-formed article 5 is transferred to the baking zone 7 by the extruding presser of the ram 3, and then baked. The baking temperature is 360° to 390° C., and the baking time is 5 to 20 minutes.

In order not to constrain the pre-formed article, the baking zone 7 has an inner diameter larger than the inner diameter of the die cylinder 4.

The baked porous article 8 is transferred to the cooling zone 9 where a crystallinity is endowed. In the cooling zone a shower 10 and the like is provided and the baked article is rapidly cooled. Alternatively, the baked article is allowed to stand.

The vertical ram-extruder may be employed instead of the horizontal ram-extruder. In this case, the pre-forming conditions should be carefully controlled, because each pre-formed article prepared by one stroke tends to be cut down due to its dead weight.

According to the processes of the present invention, there can be prepared various thick and continuous long articles such as thick pipes, prismatic lods, cylindorical lods and sheets, as well as thick and large bars and lods.

The present invention is more specifically described and explained by means of the following Examples. It is to be understood that the present invention is not limited to the Examples, and various changes and modifications may be made in the invention without departing from the spirit and scope thereof.

PREPARATION EXAMPLE 1

A powder for molding was prepared according to the following treatments of the first process by using a PTFE molding powder (average particle size 30 μm) having a melting point of 343° C. and a PFA powder (average particle size 25 μm) having a melting point of 310° C. and a decomposition initiating temperature of 450° C.

The PTFE powder and the PFA powder were mixed in the amounts shown in Table 1 with a high speed mixer for 3 minutes. The resultant mixed powder was spreaded on a tray (length 400 mm, width 200 mm, depth 60 mm), and then heated for 3 hours at 385° C. in an electric oven to gell the powder. The gelled material was cut to such an extent that the cut material can be introduced to a pulverizer. The gelled material was roughly pulverized with a horai cutter and then finely pulverized with a sample mill to give a powder having an average particle size of 600 μm.

TABLE 1

| Experimental No. | Amount (parts by weight) | |
|---|---|---|
| | PTFE | PFA |
| 1-1 | 100 | — |
| 1-2 | 97 | 3 |
| 1-3 | 90 | 10 |
| 1-4 | 80 | 20 |
| 1-5 | 65 | 35 |
| 1-6 | 50 | 50 |

PREPARATION EXAMPLE 2

A powder for molding was prepared according to the following treatments of the first process by using a PTFE molding powder (average particle size 30 μm) having a melting point of 343° C. and a FEP powder (average particle size 20 μm) having a melting point of 270° C. and a decomposition initiating temperature of 410° C.

The PTFE powder and the FEP powder were mixed in the amounts shown in Table 2 with a henschel mixer for 10 minutes, and gelled in the same manner as in Preparation Example 1. The gelled material was finely pulverized in the same manner as in Preparation Example 1 to give a powder for molding having an average particle size of 400 μm.

TABLE 2

| Experimental No. | Amount (parts by weight) | |
|---|---|---|
| | PTFE | FEP |
| 2-1 | 100 | — |
| 2-2 | 97 | 3 |
| 2-3 | 95 | 5 |
| 2-4 | 85 | 15 |
| 2-5 | 80 | 20 |
| 2-6 | 65 | 35 |
| 2-7 | 50 | 50 |

PREPARATION EXAMPLE 3

A powder for molding was prepared according to the second process. A PTFE molding powder (average particle size 30 μm) having a melting point of 343° C. was heated for 2 hours at 385° C. in the same manner as in Preparation Example 1, and then the gelled material was finely pulverized to give a PTFE gelled powder having an average particle size of 400 μm. After the gelled powder was finely pulverized to an average particle size of 90 μm, the PFA powder (average particle size 25 μm) was added thereto at a weight ratio of 8/2 (PTFE/PFA), and then mixed with the high speed mixer for 1 minute to give a powder for molding.

EXAMPLE 1

A vertical ram-extruder was charged with the powder for molding prepared according to Preparation Example 1 to 3, and the pre-forming procedures were carried out in the following conditions to produce a pre-formed bar of 10 mmφ.
  Inner diameter of die cylinder: 10 mmφ
  Length of pre-forming zone: 300 mm
  Length of packing: 70 mm
  Time for one cycle: 25 seconds
  Pre-forming temperature: shown in Table 3
  Pre-forming time: 5 seconds.

The obtained pre-formed article was cut to a length of about 400 mm, baked for 15 minutes at a temperature shown in Table 3 in a batch type oven, and then rapidly cooled with water.

The apparent gravity and the porosity of the produced PTFE articles were measured in the following methods. The results are shown in Table 3.

Apparent gravity

According to the suspending method in water with the gravity measuring machine for solid material (SGM SH200) available from Shimazu Corporation.

Porosity: %

Calculated according to the following equation.

$$\frac{\text{Gravity of PTFE (2.17)} - \text{Gravity of porous PTFE article}}{\text{Gravity of PTFE (2.17)}} \times 100$$

TABLE 3

| Powder for molding | | Pre-forming temp. (°C.) | Baking temp. (°C.) | Porous article | |
|---|---|---|---|---|---|
| Exp. No. | Binder (% by weight) | | | Gravity | Porosity (%) |
| 1-1 | — | 320 | 370 | —* | — |
| 1-2 | PFA(3) | 320 | 370 | —* | — |
| 1-3 | PFA(10) | 340 | 380 | 1.4 | 35 |
| 1-4 | PFA(20) | 340 | 380 | 1.6 | 26 |
| 1-5 | PFA(35) | 340 | 380 | 1.8 | 17 |
| 1-6 | PFA(50) | 320 | 380 | —** | — |
| 2-1 | — | 320 | 370 | —* | — |
| 2-2 | FEP(3) | 320 | 370 | —* | — |
| 2-3 | FEP(5) | 320 | 370 | 1.1 | 49 |
| 2-4 | FEP(15) | 320 | 370 | 1.4 | 35 |
| 2-5 | FEP(20) | 320 | 370 | 1.6 | 26 |
| 2-6 | FEP(35) | 320 | 370 | 1.8 | 17 |
| 2-7 | FEP(50) | 320 | 370 | —** | — |
| 3 | PFA(20) | 320 | 380 | 1.6 | 26 |

*Since the pre-formed article was not strong, the article was fallen down during the pre-forming.
**Since the pre-formed article was shrinked, the article was fallen down during the pre-forming.

PERPARATION EXAMPLE 4

A PTFE molding powder (average particle size 30 μm) having a melting point of 343° C. was gelled at 385° C. for two hours and pulverized as in Preparation Example 1 to obtain a gelled powder having an average particle size of 100 μm.

500 g of the gelled powder was pored into 1 l of an aqueous dispersion of PTFE fine powder (modified with 0.1% by weight of perfluoropropyl vinyl ether; melting point 324° C., average particle size 0.3 μm), and agitated. During the agitation, trichlorotrifluoroethane was gradually added as the water-insoluble organic liquid to the dispersion to assist the coagulation. The resultant coagulated precipitate was dried at 150° C. for 180 minutes to obtain a powder (average particle size 300 μm) for molding.

EXAMPLE 2

A bar was produced in the following conditions from the powder for molding prepared in Preparation Example 4 with the vertical ram-extruder.
  Inner diameter of die cylinder: 10 mm φ
  Length of pre-forming zone: 300 mm
  Length of packing: 70 mm
  Time for one cycle: 25 seconds
  Pre-forming temperature: 250° C.
  Pre-forming time: 5 seconds.

The obtained pre-formed article was cut to a length of about 400 mm, baked for 15 minutes at 380° C. in a batch type oven, and then rapidly cooled with water.

The apparent gravity and the porosity of the PTFE molded article were measured in the same manner as in Example 1. The article had an apparent gravity of 1.7 g/cc and a porosity of 20%.

According to the present invention, thick PTFE porous articles can be continuously produced by using PTFE molding powders.

What we claim is:

1. A molding process for preparing a porous polytetrafluoroethylene article, which comprises the following steps;
    (1a) mixing 5 to 40 parts by weight of a binder to 100 parts by weight of a polytetrafluoroethylene powder prepared by suspension polymerization, said binder comprising a resin powder which has a melting point of lower than that of polytetrafluoroethylene and does not decompose at a baking temperature of polytetrafluoroethylene,
    (1b) gelling the obtained mixed powder under the condition ranging from a temperature of not lower than the melting point of polytetrafluoroethylene to a temperature of lower than the decomposition temperature of the binder,
    (1c) finely pulverizing the gelled material to a powder having an average particle size of 80 to 1200 μm,
    (1d) preparing a pre-formed article by ram-extruding the finely pulverized powder at a temperature ranging from a temperature of lower than the melting point of polytetrafluoroethylene to a temperature of not lower than the melting point of the binder, and
    (1e) baking the pre-formed article under a non-constrained circumstance at a temperater of not lower than the melting point of polytetrafluoroethylene.

2. The process of claim 1, wherein the prepared porous polytetrafluoroethylene article has an apparent gravity of 0.8 to 1.8.

3. The process of claim 1, wherein the resin powder for the binder is a fluororesin powder.

4. The process of claim 3, wherein the fluororesin is a tetrafluoroethylene-perfluoroalkyl vinyl ether copolymer or tetrafluoroethylene-hexafluoropropylene copolymer.

5. The process of claim 1, wherein the polytetrafluoroethylene powder prepared by suspension polymerization has an average particle size of 10 to 100 μm.

6. The process of claim 1, wherein the resin powder of the binder has an average particle size of 5 to 700 μm.

7. The process of claim 1, wherein the binder is admixed in an amount of 10 to 20 parts by weight to 100 parts by weight of the polytetrafluoroethylene powder.

8. The process of claim 1, wherein the ram extrusion is carried out by using a horizontal type ram-extruder.

9. The process of claim 1, which comprises a rapid cooling step of the baked article after the baking step.

10. A Molding process for preparing a porous polytetrafluoroethylene article, which comprises the following steps;
    (2a) gelling a polytetrafluoroethylene powder prepared by suspension polymerization at a temperature of not lower than the melting point of polytetrafluoroethylene,
    (2b) finely pulverizing the gelled material to a powder having an average particle size of 80 to 1200 μm,
    (2c) mixing 5 to 40 parts by weight of a binder to 100 parts by weight of the finely pulverized polytetrafluoroethylene gelled powder, said binder comprising a resin powder which has a melting point of lower than than of polytetrafluoro-ethylene and does not decompose at a baking temperature of polytetrafluoroethylene,
    (2d) preparing a pre-formed article by ram-extruding the mixture at a temperature ranging from a temperature of lower than the melting point of polytetrafluoroethylene to a temperature of not lower than the melting point of the binder, and
    (2e) baking the pre-formed article under a non-constrained circumstance at a temperature of not lower than the melting point of polytetrafluoroethylene.

11. The process of claim 10, wherein the prepared porous polytetrafluoroethylene article has an apparent gravity of 0.8 to 1.8.

12. The process of claim 10, wherein the resin powder for the binder is a fluororesin powder.

13. The process of claim 12, wherein the fluororesin is a tetrafluoroethylene-perfluoroalkyl vinyl ether copolymer or tetrafluoroethylene-hexafluoropropylene copolymer.

14. The process of claim 10, wherein the polytetrafluoroethylene powder prepared by suspension polymerization has an average particle size of 10 to 100 μm.

15. The process of claim 10, wherein the resin powder of the binder has an average particle size of 5 to 700 μm.

16. The process of claim 10, wherein the binder is admixed in an amount of 10 to 20 parts by weight to 100 parts by weight of the polytetrafluoroethylene powder.

17. The process of claim 10, wherein the ram extrusion is carried out by using a horizontal type ram-extruder.

18. The process of claim 10, which comprises a rapid cooling step of the baked article after the baking step.

19. A molding process for preparing a porous polytetrafluoroethylene article, which comprises the following steps;
    (3a) gelling a polytetrafluoroethylene powder prepared by suspension polymerization at a temperature of not lower than the melting point of polytetrafluoroethylene,
    (3b) finely pulverizing the gelled material to a powder having an average particle size of 5 to 1200 μm,
    (3c) mixing the finely pulverized gelled powder with an aqueous dispersion of a polytetrafluoroethylene fine powder prepared by emulsion polymerization so that a weight ratio of the finely pulverized gelled powder/the polytetrafluoroethylene fine powder is 100/5-40, and then coagulating the both powders,
    (3d) preparing a pre-formed article by ram-extruding the coagulated powder at 180° to 330° C., and
    (3e) baking the pre-formed article under a non-constrained circumstance at a temperature of not lower than the melting point of polytetrafluoroethylene.

20. The process of claim 19, wherein the polytetrafluoroethylene fine powder prepared by emulsion polymerization is a polytetrafluoroethylene modified with a perfluoroalkyl vinyl ether.

21. The process of claim 19, wherein the ram extrusion is carried out by using a horizontal type ram-extruder.

22. The process of claim 19, which comprises a rapid cooling step of the baked article after the baking step.

* * * * *